United States Patent [19]
Verma et al.

[11] Patent Number: 6,083,416
[45] Date of Patent: Jul. 4, 2000

[54] CORROSION INHIBITING PROCESSES FOR REFRIGERATION SYSTEMS

[75] Inventors: Shyam Kumar Verma, Gastonia, N.C.; Manuel Sarkis Mekhjian, Fremont, Calif.; George Robert Sandor, Gastonia, N.C.; Philip John Boon, Lower Heswall, United Kingdom

[73] Assignee: FMC Corporation, Philadelphia, Pa.

[21] Appl. No.: 08/895,288

[22] Filed: Jul. 16, 1997

Related U.S. Application Data

[60] Provisional application No. 60/022,217, Jul. 18, 1996.

[51] Int. Cl.[7] ................................................. C09K 5/00
[52] U.S. Cl. ............................... 252/69; 252/68; 252/390
[58] Field of Search ................................ 252/68, 69, 390

[56] References Cited

U.S. PATENT DOCUMENTS

| | | |
|---|---|---|
| 2,725,364 | 11/1955 | Dazzi . |
| 3,424,601 | 1/1969 | Hamilton . |
| 3,478,530 | 11/1969 | Aronson .................................. 62/112 |
| 4,077,929 | 3/1978 | Robinson . |
| 4,311,024 | 1/1982 | Itoh et al. . |
| 4,431,563 | 2/1984 | Krawczyle et al. ..................... 252/189 |
| 4,470,272 | 9/1984 | Stoh et al. ................................ 252/68 |
| 4,563,253 | 1/1986 | Leisheiser, Jr. et al. . |
| 4,612,378 | 9/1986 | Bosshard et al. . |
| 5,152,929 | 10/1992 | Bentley et al. . |
| 5,206,404 | 4/1993 | Gunkel et al. . |
| 5,653,117 | 8/1997 | Kajak ....................................... 252/69 |

FOREIGN PATENT DOCUMENTS

| | | |
|---|---|---|
| 0 573 082 | 12/1993 | European Pat. Off. . |
| 56-038479 | 4/1981 | Japan . |
| 1155157 | 12/1987 | Japan . |
| 63-187072 | 8/1988 | Japan . |

OTHER PUBLICATIONS

Tsygankova et al., "Protection of Steel by Hydroxyquinoline Films from Corrosion in Lithium Bromide Solutions," *Protection of Metals*, vol. 27, No. 2, Mar. 1, 1991, pp. 288–291.

JP 01 155 157 A, WPI/Derwent Abstract, Jun. 19, 1989.

Sastri et al., "Surface Analysis in Corrosion Inhibition Mechanisms," *Werkstoffe Und Korrosion*, vol. 39, No. 2, pp. 77–82, Feb., 1987, West Germany.

Granese et al., "The Inhibition Action of Heterocyclic Nitrogen Organic Compounds on Fe and Steel in HC1 Media," *Corrosion Science*, vol. 33, No. 9, pp. 1439–1453, Sep., 1992, UK.

Chemical Abstracts, vol. 126, No. 3, Jan. 20, 1997, Columbus, Ohio, abstract No. 34170, Gorski et al: "Brake Fluid," & PL 166 099 A.

Tanno et al., "The Corrosion of Carbon Steel in Lithium bromide Solution at Moderate Temperatures," *Corrosion Science*, vol. 34, No. 9, pp. 1441–1451, Sep., 1993.

Russian Patent Abstract 1685970 (1991).

*Primary Examiner*—Jacqueline V. Howard
*Attorney, Agent, or Firm*—Alston & Bird LLP

[57] ABSTRACT

Organic compounds useful as anticorrosion agents in refrigeration systems. The organic compounds can be added directly into the refrigeration systems. Alternatively the organic compound can be added to an alkali metal halide absorption refrigeration solutions. The organic compounds can minimize corrosion of the refrigeration system.

14 Claims, 2 Drawing Sheets

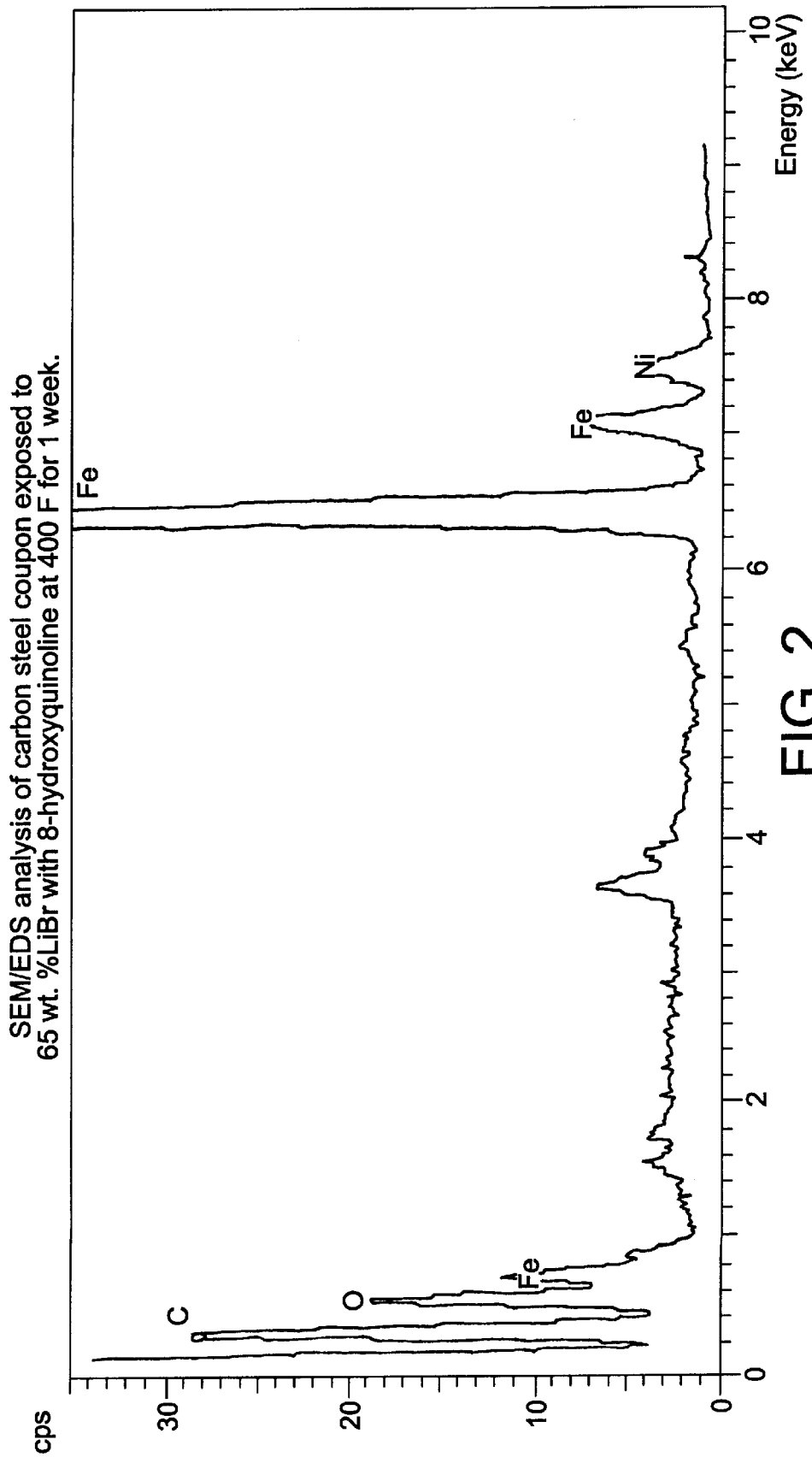

CORROSION INHIBITING PROCESSES FOR REFRIGERATION SYSTEMS

CROSS REFERENCE TO RELATED APPLICATION

This application is related to commonly owned copending Provisional Application Ser. No. 60/022,217, filed Jul. 18, 1996.

FIELD OF THE INVENTION

This invention relates generally to minimizing corrosion in refrigeration systems, and in particular to processes and solutions which include organic corrosion inhibiting agents for absorption refrigeration systems.

BACKGROUND OF THE INVENTION

Absorption refrigeration machines are widely used in commercial operations. A typical absorption refrigeration machine includes four major sections: absorber, generator, condenser, and evaporator.

In the absorber section, an absorbent fluid, typically an aqueous alkali metal halide solution, such as a lithium bromide solution, absorbs a refrigerant, typically water vapor. The absorber can be operated under sub-atmospheric pressure. The resultant weak or diluted absorbent fluid (about 40–58% concentration of alkali metal halide rich in the refrigerant) is pumped to the generator. Here heat is applied to the fluid to partially boil off the refrigerant to again concentrate the absorbent fluid. The concentrated absorbent solution (now about 63–65% alkali metal halide) from the generator is passed through a heat exchanger and then sprayed back into the absorber section where it resumes absorption of the refrigerant vapor.

The refrigerant vapor liberated in the generator migrates to the condenser where it is liquefied by exchanging heat with a cooling fluid (typically water) flowing through tubing (typically copper based alloy tubes) present in the condenser section. The liquid refrigerant in the condenser moves into the evaporator, which is also operated at an extremely low pressure. In the evaporator, the refrigerant cools the relatively warm system water circulating through the tubes of the tube bundle, and the chilled water is circulated to the load. Heat from the system water vaporizes the refrigerant water which then migrates to the absorber section for absorption into the concentrated solution and completes the cycle.

Aqueous alkali metal halide solutions are widely used as absorption fluids in commercial absorption refrigeration systems. An exemplary alkali metal halide solution for this application is a lithium bromide solution, adjusted to pH range of 7–13 with lithium hydroxide. Although this and other types of absorption solutions can be advantageous for the refrigeration cycles, alkali metal halides can be corrosive towards the materials used to construct the refrigeration machine. Such materials can include mild and stainless steel for containment components and copper or copper-nickel alloys for tube bundles, among others.

In addition to the surface damage caused by corrosion, the corrosion reaction evolves hydrogen gas as a byproduct. Incondensibles in the form of atoms or ions can easily enter and diffuse into metals, resulting in the degradation of their mechanical properties under certain system conditions. Incondensible gases also affect the performance of the machine.

The severity of corrosion can vary, depending upon factors such as temperature of the system, concentration of alkali metal halide in the absorption solution, metals used in the construction of the refrigeration unit, the presence of air, and the like. For example, during use, the internal temperatures of such machines can be high, typically up to about 450° F. and higher, depending on the type of the absorption cycle, which can increase the corrosive effect of the alkali metal halide solution.

Various additives, such as lithium chromate, lithium nitrate, and lithium molybdate, have been proposed as corrosion inhibitors in alkali metal halide absorption solutions. However, lithium chromate can raise environmental concerns, and its use is being phased out. Further, the level of chromate and its oxidation state must be carefully maintained. If too little chromate is used, then it does not properly passivate the whole metal surface and pitting can result. Lithium nitrate can potentially evolve ammonia, which can cause stress corrosion cracking of copper based alloys such as heat exchanger tubes. Lithium molybdate exhibits only limited solubility in alkali metal halide solutions. In addition, lithium molybdate is metastable in aqueous halide solutions and thus it can be difficult to maintain a constant concentration of molybdate ions in solution.

SUMMARY OF THE INVENTION

The present invention provides processes for inhibiting corrosion of refrigeration systems which use an absorbent fluid, typically an aqueous alkali metal halide solution, such as a lithium bromide solution. In the invention, a suitable organic compound can be added directly into the refrigeration machine. Alternatively, the organic compound can be added to an absorbent fluid, and the fluid then added to and circulated through the refrigeration system.

The use of organic compounds as anticorrosion agents can provide comparable and even improved corrosion inhibition as compared to solutions which include conventional corrosion inhibition additives. For example, the invention can provide good anticorrosion benefits without pitting and severe crevice corrosion which can result for carbon steel at high temperatures using conventional corrosion inhibitors such as lithium chromate.

Other advantages include reduced corrosion of the construction materials of the refrigeration machine, such as carbon steel, due to vapor phase, reduced amount of hydrogen generation up to 400° F. and enhanced performance of the chillers, due to reduced accumulation of non-condensable gas in the absorber.

Still further, use of the organic compounds in a refrigeration machine can result in a protective layer of magnetite (iron oxide) formed on carbon steel. No pitting or crevice corrosion were found in the presence of additives disclosed in this invention.

BRIEF DESCRIPTION OF THE DRAWINGS

Some of the features and advantages of the invention having been described, others will become apparent from the detailed description which follows, and from the accompanying drawings, in which:

FIG. 2 is a graph illustrating surface analysis of the coupon of FIG. 1 using scanning electron microscopy/energy dispersive spectrometry (SEM/EDS) technique.

DETAILED DESCRIPTION OF THE INVENTION

Figure 1:
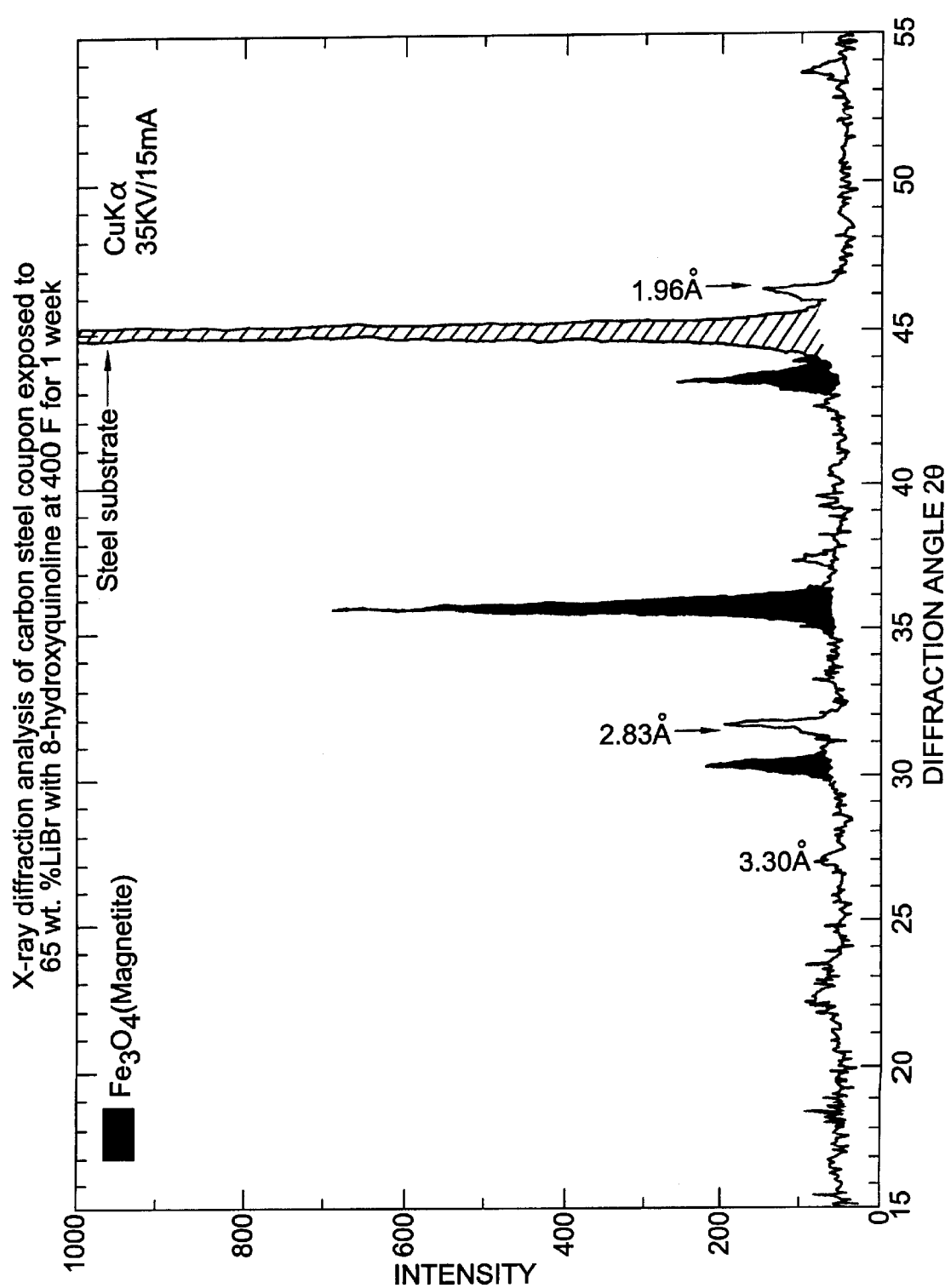
FIG. 1 is an x-ray diffraction pattern of a surface layer formed on carbon steel coupons exposed to 8-hydroxyquinoline (1000 ppm)/LiBr solution (65 wt. %) at 400° F. for one week.

Organic compounds useful as corrosion inhibiting agents in refrigeration systems which use an alkali metal halide absorption solution are selected from those organics which can exhibit corrosion inhibiting properties in absorption refrigeration systems. Exemplary organic compounds useful in the invention include, but are not limited to, heterobicyclic organic compounds which contain at least one nitrogen atom as part of the ring structure; thio-carboxylic acids containing heterocyclic substituents; organophosphates; and mixtures thereof. Exemplary nitrogen-containing heterobicyclic organic compounds include, but are not limited to, quinoline, tetrahydroquinoline, isoquinoline, tetrahydroisoquinoline, quinazoline, quinoxaline, 2,3-benzopyrrole, carboxylic, aldehyde or hydroxy derivatives thereof, and mixtures thereof.

Exemplary thio-carboxylic acids containing heterocyclic substituents include benzothiazoyl-thio-carboxylic acids, benzooxazolyl-thio-carboxylic acids, and benzimidazolyl-thio-carboxylic acids, such as (2-benzothiazolylthio)-butanedioic acid, commercially available from Ciba-Giegy Corporation as "Irgacor", (2-benzothiazolylthio)-succinic acid, and the like and mixtures thereof. These and others are described, for example, in U.S. Pat. No. 2,725,364; DE 19623268; U.S. Pat. No. 4,612,378; U.S. Pat. No. 5,152,929; and U.S. Pat. No. 5,347,008, the entire disclosure of each of which is hereby incorporated by reference.

Exemplary organophosphates include, but are not limited to, substituted and unsubstituted triaryl phosphates, such as trixylenyl phosphate, commercially available from FMC Corporation as "Durad 220X" and tricresyl phosphate, commercially available from FMC Corporation as "Durad 125"; alkylated phenyl phosphate esters and alkyl acid orthophosphates, such as that commercially available from Octel America Inc. as "Ortholeum", as well as mixtures thereof. These compounds are described, for example, in U.S. Pat. Nos. 3,424,601 and 5,206,404, the entire disclosure of each of which is hereby incorporated by reference.

Although not wishing to be bound by any explanation of the invention, it is currently believed that the organic compounds can be absorbed onto surfaces present in the refrigeration system and can form a protective layer thereon. Typically, organic compounds have limited solubility in alkali metal halide solutions, such as lithium bromide solutions. This has limited the use of such compounds in absorption refrigeration solutions. However, the inventors have found that the organic compounds are capable of providing protection so long as the compound is introduced into the refrigeration system in quantities sufficient to provide a protective, anticorrosion effect. For example, a suitable organic compound can be added directly into the refrigeration machine. Alternatively, the organic compound can be added to the absorbent fluid, and the fluid then circulated through the refrigeration system. Even organic compounds with little or no solubility in brine solutions can be circulated through the system and provide a protective effect. Further, various organic compounds do exhibit some solubility in the brine absorption solutions at increased temperatures. In this regard, the brine solution can be preheated and organic compound added to the heated solution prior to addition to the refrigeration system. Even if the organic compound is added directly into the refrigeration system, at least some of the organic compound can be solubilized in the brine solution due to the high operating temperatures of the system.

The organic compounds can be used singly or as mixtures with one another and/or with other corrosion inhibiting agents. The organic compounds are present in the refrigeration system in amounts sufficient to provide the desired corrosion inhibiting effect. This amount can vary depending upon various factors, such as the solubility of the organic compound in the absorption solution, the nature of organic compound, temperature of the environment of the refrigeration machine, concentration of the alkali metal halide solution, metals used in the construction of the refrigeration unit, the presence of air, and the like. Preferably, organic compounds are added to refrigeration systems in an amount ranging from about 100 ppm to about 5000 ppm, and more preferably from about 300 to about 3000 ppm.

The absorption solutions include alkali metal halide in conventional amounts. An exemplary alkali metal halide solution includes alkali metal halide in an amount from about 40 to about 65 weight percent, preferably about 50 to about 65 weight percent, based on the total weight of the solution. The alkali metal halide can be, for example, lithium halide, preferably lithium bromide, although the absorption solution can include other alkali metal halides, such as lithium chloride, lithium iodide, as well as mixtures of these. Further, the absorption solution can include lithium nitrate. Still further, the absorption solution can include other halides, such as zinc halides, which are particularly useful in high temperature applications (generally about 450° F. and higher). The zinc halides can be present in amounts up to about 45 weight percent (for example, a solution comprising 45 wt. % zinc halide and 20 wt. % lithium bromide).

As the skilled artisan will appreciate, the environment or conditions, such as temperature and/or pressure, of different refrigeration machines can vary. Typically, the temperature of the machine ranges from about 150° F. to about 500° F., although the temperature can be outside this range as well. The solutions of the invention are particularly advantageous in higher temperature applications.

The present invention will be further illustrated by the following non-limiting examples.

EXAMPLE 1

Tests were performed in a pressure vessel autoclave with temperature control (+/−2° F.). A concentrated (65 wt. %) lithium bromide solution was prepared using anhydrous lithium bromide and deionized water. Sample solutions were prepared by adding an additive to the lithium bromide solution. Each additive was added individually to 800 ml lithium bromide solution. Pre-weighed metal coupons were placed in and above the lithium bromide solution contained in a 2 liter cylinder made of Inconel-600 which fits into the autoclave. The cylinder containing the absorption solution and metal coupons was evacuated (to about 29.6 in of Hg) using a vacuum pump prior to starting the test. The solution was heated to a specified temperature and held at that temperature for a period of 72 hours.

Upon completion, the test coupons were removed and cleaned. The corrosion rate was calculated from the weight loss. The coupons were also tested by surface analysis. The results are set forth in Table 1 below. Corrosion rate (mpy) refers to mils per year.

TABLE 1

Corrosion Rates for Carbon Steel at 72 Hours in 65 wt. % LiBr

| Additive | Concentration (ppm) | Corrosion Rate (mpy) at | | |
|---|---|---|---|---|
| | | 350° F. | 400° F. | 450° F. |
| None | — | 41 | 220 | 326 |
| Lithium molybdate | 160 | 64 | 38 | 43 |

TABLE 1-continued

Corrosion Rates for Carbon Steel at 72 Hours in 65 wt. % LiBr

| Additive | Concentration (ppm) | Corrosion Rate (mpy) at | | |
|---|---|---|---|---|
| | | 350° F. | 400° F. | 450° F. |
| 8-Hydroxyquinoline | 500 | 4.5 | 6.5 | 37 |
| | 1000 | 5.0 | 5.8 | 13 |
| | 1500 | 0.7 | 1.7 | 4.8 |
| | 3000 | 0.5 | 0.7 | 2.0 |
| Irgacor-252 | 500 | 21 | 21 | — |
| Durad 125 | 500 | — | 13 | 15 |
| Durad 220X | 500 | — | 6.4 | 12 |
| Ortholium-162 | 500 | — | 9.6 | 16 |

EXAMPLE 2

Tests were performed as described above in Example 1, except that corrosion rates were evaluated for carbon steel coupons in 65 wt. % LiBr solution at temperatures from 300–450° F. for a period of 168 hours. The results are set forth in Table 2 below.

TABLE 2

Corrosion Rates for Carbon Steel at 168 Hours in 65 wt. % LiBr

| Additive | Corrosion Rate (mpy) at | | | |
|---|---|---|---|---|
| | 300° F. | 350° F. | 400° F. | 450° F. |
| None | 25 | 60 | 118 | 132 |
| Lithium molybdate | | | | |
| 199 ppm, pH = 11–12 | 9 | 10 | 12 | 14 |
| 8-hydroxyquinoline | | | | |
| 1000 ppm, pH = 11–12 | 0.4 | 1.7 | 2.9 | 4.7 |
| 1000 ppm, pH = 8–10 | 2.9 | 3.2 | 3.2 | 10 |

Hydrogen generation was also calculated and is set forth below for carbon steel in 65 wt. % LiBr at 168 hours for various additives. These results are set forth in Table 3 below.

TABLE 3

Hydrogen Generation from Carbon Steel in 65 wt. % LiBr at 168 Hours

| Additive | Hydrogen Generation (mg/in$^2$) at | | | |
|---|---|---|---|---|
| | 300° F. | 350° F. | 400° F. | 450° F. |
| None | 0.5 | 27 | 36 | 37 |
| Lithium molybdate | | | | |
| 199 ppm, pH = 11–12 | 2.7 | 2 | 6.9 | 7.9 |
| 8-hydroxyquinoline | | | | |
| 1000 ppm, pH = 12 | 0.1 | 1.6 | 5.4 | 13 |
| 1000 ppm, pH = 9 | 0.5 | 7.6 | 7.8 | 21 |

Surface analysis of the coupons exposed to the 8-hydroxyquinoline (1000 ppm)/LiBr solution (65 wt. %) at 400° F. for one week was also conducted using X-ray diffraction and scanning electron microscopy/energy dispersive spectrometry (SEM/EDS) techniques. The X-ray diffraction measurements were carried out on a wide angle diffractometer using CuKα radiation with a diffracted beam monochromator. FIG. 1 presents the X-ray diffraction pattern of a specific area of the metal coupon where a protective coating was formed after an attack from the brine solution. The peaks seen in the spectra identify formation of magnetite as the major phase on the metal surface.

The SEM/EDS analysis of the specific coated site on the treated coupon surface is presented in FIG. 2. This spectra indicates that the protective film also contains carbon and oxygen atoms which belong to the 8-hydroxyquinoline molecule.

These results demonstrate that in the presence of 8-hydroxyquinoline, a protective coating containing carbon originating from the additive and magnetite is formed at the sites where the corrosion action of the brine solution occurs. The formation of the protective coating resists further degradation of metal due to corrosion.

EXAMPLE 3

L. E. Tsygankova, et al., Zaschita Metallov, vol. 27, No. 2. pps. 344–347 (1991), proposed a method for coating carbon steel (St3) with 8-hydroxyquinoline. The article reports holding carbon steel coupons in 0.5% or 0.2% solutions of 8-hydroxyquinoline ("8-HQ") in water at 100° C. for 50 hours. The 50 hour period was stated to be sufficient for greater than 90% film buildup.

The corrosion rates after keeping the coated steel in 40–60% LiBr solution at 150° C. for 100 hours were reported to be as follows:

| 8-HQ in water, wt. % | Corrosion Rate at 150° C. (100 hours) g/(m$^2$,h) |
|---|---|
| 0.2 | 0.33 |
| 0.5 | 0.47 |

To demonstrate the improved benefits of the present invention, the inventors followed procedure set forth in this article. Carbon steel coupons were treated in a 0.5% solution of 8-HQ in water at 100° C. for 50 hours. The coupon showed a non-uniform coating with blobs of material, several layers thick, isolated on the coupon surface. The coating was found to be gooey.

In a second test, three carbon steel coupons were treated in a 0.2% solution of 8-HQ in water at 100° C. for 67 hours. A uniform film was formed on the coupon.

Scanning electron micrograph analysis was conducted of the carbon steel coupons coated from solutions of 0.2 and 0.5 wt. % 8-HQ in water after the treatment with 8-HQ. The scan of the coupon treated with 0.5 wt. % 8-HQ solution showed a large deposition of the organic compound, as indicated by a large carbon peak. Peaks for iron were very small, suggesting a morphology of a scale type, several layers thick, deposition of the organic compound.

The scan of the coupon with a relatively thinner layer of coating after treatment with 0.2 wt. % 8-HQ solution also showed a significant level of organic deposition, as indicated by a large carbon peak. Some areas also showed iron. Another scan of a cleaner area of this same coupon with relatively thinner coating showed some carbon deposition and a peak for the surface iron. This suggested a relatively thinner coating on the coupon.

Corrosion tests were also conducted of the resultant coupons. The coated coupons were prepared as described in this example above in a 0.2 wt. % solution of 8-HQ in water at 100° C. for 67 hours. The coupons were then air dried and tested in 65 wt. % LiBr solution at 400° F. under vacuum of 29.6 inches of mercury. Results are summarized below.

Corrosion rate (mpy)=201, 223

Hydrogen evolved (mg/in$^2$)=59

The corrosion rate seen in this case was significantly high. It is also supported by the high level of hydrogen generation. After the test, the coupon showed significant corrosion on the surface.

The L. E. Tsygankova, et al. article determined all corrosion rates reported therein at 150° C. (302° F.). The reported corrosion rate at 302° F. for a 0.2% solution treated coupon was about 14.6 mpy. Corrosion rate usually found at 300° F. is relatively low.

In the present studies, the corrosion rate for carbon steel at 300° F. in uninhibited 65 wt. % LiBr solution (0.06 N alkalinity) was found to be 25 mpy. However, as demonstrated in Examples 1 and 2 above, the use of 8-HQ in situ in LiBr solutions resulted in remarkably low corrosion rates of less than 5 mpy under harsher conditions (450° F.).

The above demonstrates that coating carbon steel with 8-HQ as reported by the L. E. Tsygankova, et al. article does not provide adequate corrosion protection for LiBr. In comparison, the process of the invention carried out in LiBr in situ using 8-HQ have shown excellent corrosion protection at temperatures up to 450° F.

The foregoing examples are illustrative of the present invention and are not to be construed as limiting thereof.

What is claimed is:

1. An absorption solution for refrigeration systems, comprising at least one alkali metal halide and at least one organic compound in an amount sufficient to provide a corrosion inhibiting effect, said at least one organic compound being selected from the group consisting of nitrogen containing heterobicyclic organic compounds, thio-carboxylic acid containing heterocyclic substituents, organophosphates and mixtures thereof.

2. The solution of claim 1, wherein said at least one organic compound has corrosion inhibiting properties in absorption refrigeration systems.

3. The solution of claim 1, wherein said organic compound comprises at least one nitrogen containing heterobicyclic organic compound selected from the group consisting of quinoline, tetrahydroquinoline, isoquinoline, tetrahydroisoquinoline, quinazoline, quinoxaline, 2,3-benzopyrrole, carboxylic, aldehyde or hydroxy derivatives thereof, and mixtures thereof.

4. The solution of claim 3, wherein said at least one nitrogen containing heterocyclic organic compound comprises 8-hydroxyquinoline.

5. The solution of claim 1, wherein said at least one thio-carboxylic acid containing heterocyclic substituents comprises at least one compound selected from the group consisting of benzothiazolyl-thio-carboxylic acids, benzooxazolyl-thio-carboxylic acids, benzylimidazolyl-thio-carboxylic acids, and mixtures thereof.

6. The solution of claim 5, wherein said at least one thio-carboxylic acid containing heterocyclic substituents comprises (2-benzothiazolylthio)-butanedioic acid.

7. The solution of claim 1, wherein said at least one organophosphate is selected from the group consisting of substituted and unsubstituted triphenyl phosphates, alkylated phenyl phosphate esters, alkyl acid orthophosphates, and mixtures thereof.

8. The solution of claim 7, wherein said substituted and unsubstituted triphenyl phosphates comprises trixylenyl phosphate, tricresyl phosphate, and mixtures thereof.

9. The solution of claim 1, wherein said at least one organic compound is present in an amount of about 100 to about 5000 ppm.

10. The solution of claim 1, wherein said at least one alkali metal halide is selected from the group consisting of lithium bromide, lithium chloride, lithium iodide and mixtures thereof.

11. The solution of claim 1, further comprising zinc halide.

12. The solution of claim 1, further comprising lithium nitrate.

13. An absorption solution for refrigeration systems, comprising at least one alkali metal halide and hydroxyquinoline in an amount sufficient to provide a corrosion inhibiting effect.

14. The solution of claim 1, wherein said organic compound is present in an amount sufficient to provide a corrosion inhibiting effect at a temperature of about 300° F.

* * * * *